US008958602B1

(12) United States Patent
Lane et al.

(10) Patent No.: US 8,958,602 B1
(45) Date of Patent: Feb. 17, 2015

(54) SYSTEM FOR TRACKING MARITIME DOMAIN TARGETS FROM FULL MOTION VIDEO

(71) Applicant: The United States of America as represented by the Secretary of the Navy, Washington, DC (US)

(72) Inventors: Corey A. Lane, San Diego, CA (US); Heidi L. Buck, San Diego, CA (US); Joshua S. Li, Laguna Nigel, CA (US); Bryan D. Bagnall, San Diego, CA (US); John C. Stastny, San Diego, CA (US); Eric C. Hallenborg, San Diego, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 13 days.

(21) Appl. No.: 14/040,027

(22) Filed: Sep. 27, 2013

(51) Int. Cl.
*G06K 9/00* (2006.01)
*H04N 7/18* (2006.01)
*H04N 5/14* (2006.01)
*H04N 5/232* (2006.01)
*G06T 7/00* (2006.01)

(52) U.S. Cl.
CPC ........... *H04N 5/144* (2013.01); *H04N 5/23251* (2013.01); *G06T 7/004* (2013.01); *G06K 9/0063* (2013.01); *G06K 9/00771* (2013.01); *G06K 9/00711* (2013.01)
USPC .......................................... 382/103; 348/143

(58) Field of Classification Search
CPC ..... G06K 9/0063; G06K 9/3241; G06K 9/40; G06K 9/00711; G06K 9/00744; G06K 9/00771; H04N 5/144; H04N 5/23251; H04N 5/357; G06T 7/004; G06T 2207/20182
See application file for complete search history.

(56) References Cited

U.S. PATENT DOCUMENTS

| 4,652,907 | A | * | 3/1987 | Fling | 348/621 |
| 5,276,512 | A | * | 1/1994 | Onda | 348/620 |
| 5,627,905 | A | * | 5/1997 | Sebok et al. | 382/107 |
| 5,649,021 | A | * | 7/1997 | Matey et al. | 382/128 |
| 5,790,686 | A | * | 8/1998 | Koc et al. | 382/107 |
| 7,526,100 | B1 | * | 4/2009 | Hartman et al. | 382/103 |
| 8,116,522 | B1 | | 2/2012 | Buck et al. | |
| 8,170,272 | B1 | | 5/2012 | Joslin et al. | |

(Continued)

OTHER PUBLICATIONS

Hmam, Hatem, and Jijoong Kim, "Aircraft Recognition and Pose Estimation", Visual Communications and Image Procedding 2000, Int. Society for Optics and Photonics, 2000.

*Primary Examiner* — Manav Seth
(74) *Attorney, Agent, or Firm* — SPAWAR Systems Center Pacific; Kyle Eppele; Ryan J. Friedl

(57) ABSTRACT

A method and system are provided for processing maritime video data to improve processing time and reduce the risk of false detection. Video data input may be received from satellites, aircrafts, UAVs and other aerial vehicles. The method and system create annotated video output files indicating the location of tracked anomalies. The method and system perform an anomaly detection function on each data frame within the video input, identify anomalous regions within each data frame, and identify clusters. The method and system then perform an algorithm to discard clusters which do not meet threshold criteria to reduce the risk of false detection, as well as employ a horizon detection algorithm to eliminate superfluous image data unrelated to tracking maritime targets.

20 Claims, 5 Drawing Sheets

(56) References Cited

U.S. PATENT DOCUMENTS

| | | |
|---|---|---|
| 8,411,969 B1 | 4/2013 | Joslin et al. |
| 8,422,738 B1 | 4/2013 | Stastny et al. |
| 8,437,509 B1 | 5/2013 | Hallenborg et al. |
| 8,823,810 B2* | 9/2014 | Mistretta et al. ............ 348/208.4 |
| 8,890,950 B2* | 11/2014 | Rhoads ......................... 348/100 |
| 2006/0182311 A1* | 8/2006 | Lev .............................. 382/103 |
| 2006/0188169 A1* | 8/2006 | Tener et al. ................... 382/254 |
| 2006/0291693 A1* | 12/2006 | Olson et al. ................... 382/103 |
| 2007/0071342 A1* | 3/2007 | Bilbrey et al. ................ 382/254 |
| 2008/0285656 A1* | 11/2008 | Au et al. ................... 375/240.22 |
| 2009/0274390 A1* | 11/2009 | Meur et al. .................... 382/275 |
| 2011/0081046 A1* | 4/2011 | van Eekeren et al. ........ 382/103 |
| 2013/0147951 A1* | 6/2013 | Brown et al. ................. 348/143 |
| 2013/0343602 A1* | 12/2013 | Snider et al. ................. 382/103 |

* cited by examiner

SYSTEM FOR TRACKING MARITIME DOMAIN TARGETS FROM FULL MOTION VIDEO

FEDERALLY-SPONSORED RESEARCH AND DEVELOPMENT

The System and Method for Tracking Maritime Domain Targets from Video Data is assigned to the United States Government. Licensing inquiries may be directed to Office of Research and Technical Applications, Space and Naval Warfare Systems Center, Pacific, Code 72120, San Diego, Calif., 92152; telephone (619) 553-5118; email: ssc_pac_t2@navy.mil. Reference Navy Case No. 101704.

BACKGROUND

Satellite images offer unprecedented geographical range of detection at high spatial resolution. However, current satellites are not equipped with video and thus cannot provide high temporal resolution. Full-motion video (FMV) is the display of video images at a rate of at least thirty frames per second, at which objects appear to move smoothly and continuously. FMV capability is critical to assessing target movement and is used on many aircraft vehicles, both manned and unmanned. Several problems are known in the art with respect to the processing of video taken by aircraft and UAVs.

One limitation is the so-called "horizon effect", which is a function of the angle at which images are captured. Satellites take images from a vantage point directly over the water's surface. However, aircrafts and UAVs often capture a portion of the skyline above the water. Skyline image data is superfluous data that is not useful for maritime threat detection. It is difficult for computerized image-processing systems to detect the difference between water and horizon. Erroneous detections (i.e., "false positives") may result from the processing of extraneous video data.

Another problem known in the art specific to aircraft and UAV video is dependency on human analysis. Human analysis requires cross-verification from multiple user inputs and produces unreliable detection. Each video must be independently watched and monitored for anomalies that may be potential targets. When an analyst recognizes a target, information about the target must then be manually recorded, introducing further potential for error.

There is an unmet need to increase the speed and accuracy at which video data obtained from aircrafts, UAVs and satellites can be analyzed to maintain the Navy's' dominance in threat detection. There is a further unmet need for information-dominance systems that can accurately process data depicting a horizontal demarcation between water and sky in video images.

It is desirable to provide rapid, automated-analysis capability for satellite, aircraft and UAV video data that is not prone to human error and that may be used for recorded data or live feeds.

SUMMARY

The system receives one video in a data file or in a real time data stream for a satellite, aircraft or other aerial vehicle. The system performs an anomaly detection function on each frame and designates a plurality of sub-frames for each video frame. Each of the sub-frames has a quasi-unique grid location. The system then calculates a signal-to-noise ratio value for each sub-frame, comparing it to a threshold to distinguish anomalous sub-frames and non-anomalous sub-frames. Additional algorithms identify clusters which are then filtered for shape and size to avoid false detection. Each non-filtered anomaly is geographically tracked, and is identified as a potential target when it appears in a threshold number of video frames. The system may also perform a horizon detection algorithm to discard superfluous skyline data.

DETAILED DESCRIPTION OF SOME EMBODIMENTS

The subject matter disclosed herein relates to the field of image analysis, and more specifically to a method and system for automatically detecting and tracking maritime targets from full motion video (FMV) captured from sources such as Unmanned Aerial Vehicles (UAVs), ship mounted cameras, and shore mounted cameras. The disclosed system and method provide for more rapid analysis of huge amounts of video data than can be done manually, allow for more data to be analyzed, and allow for the automatic export and logging of identified targets of interest, which saves operators from having to manually determine tracks by watching the video.

Figure 1:
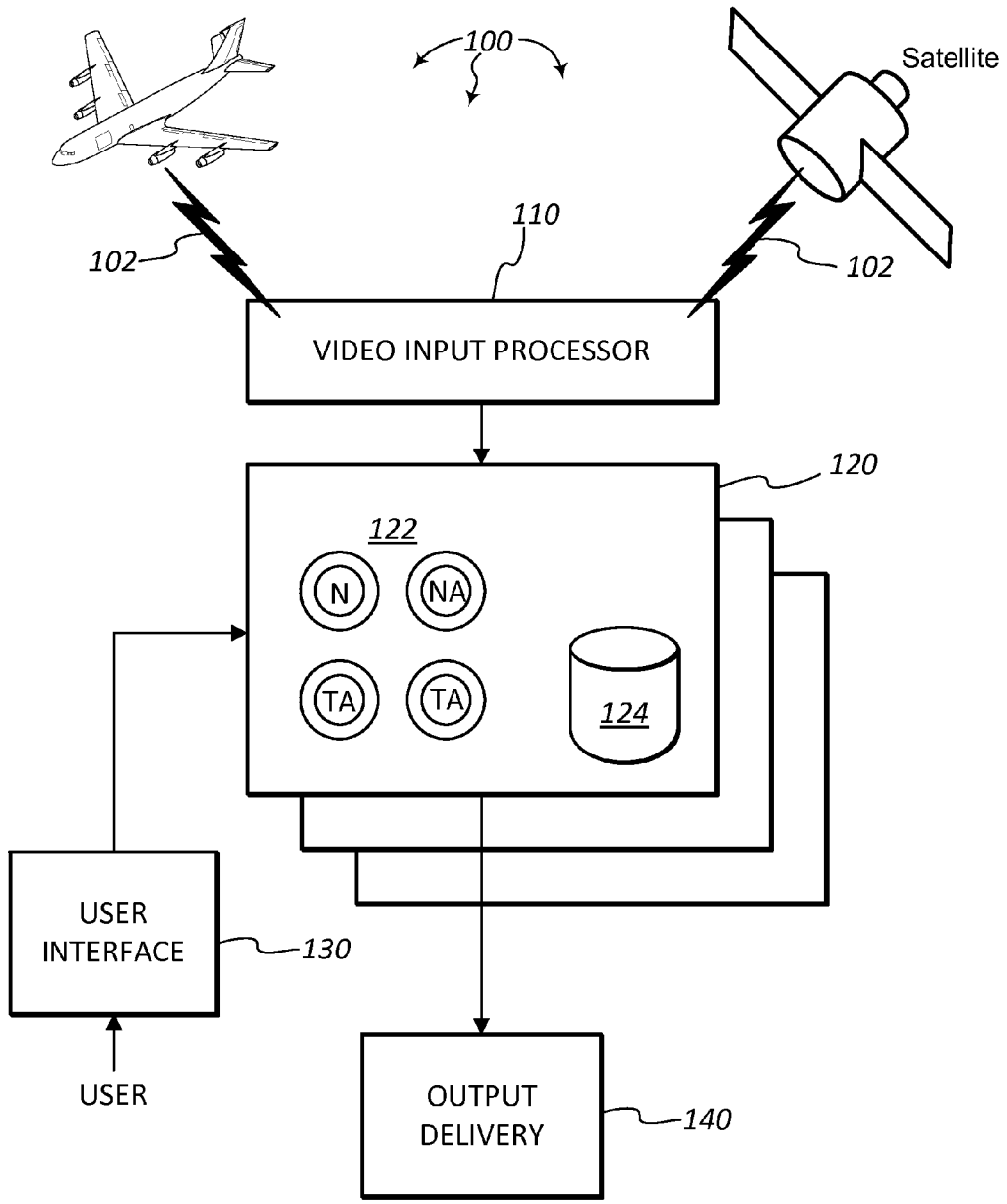
FIG. 1 shows an embodiment of a system for tracking maritime domain targets from video data.

FIG. 1 illustrates an embodiment of a system 100 for generating an analysis of maritime domain targets from video data. System 100 includes video input 102, video input processor 110, computer processing component 120, anomaly objects 122, memory storage component 124, user interface 130, and output delivery component 140.

In the exemplary embodiment shown in FIG. 1, computer processing component 120 may be a computer, network or a plurality of processing components located on a single computer capable of transforming maritime video data. Computer processing component 120 is further configured with software for creating and updating data structures and data values that may represent maritime anomalies, targets and multiple simultaneously-updated data structures. In various embodiments, computer processing component 120 may update data structures in real time to reflect the state of multiple maritime image anomalies, tracked objects and identified targets. Properties of multiple anomaly objects 122 may be concurrently updated.

In the embodiment shown, user interface 130 is operatively coupled to one or more computer processing components 120 for performing functions and for processing and transforming data. In various exemplary embodiments, user interface 130 may include a graphical user interface, a command line interface, or a C++ Application Programming Interface (API). User interface 130 is capable of receiving parameter values and metadata specifications from a user or a programmer to create system-defined values or user-defined parameters and metadata specifications required for identifying and tracking maritime image anomalies and instantiating data structures and objects to track objects of interest.

Video input processor 110 may be any software or hardware component known in the art that may store video input 102 as a plurality of identifiable video frames for which representative data structures may be created and upon which processes may be performed. In various embodiments, video input processor 110 may be configured with software for receiving and processing proprietary or non-standard types of video input. In still other embodiments, the user may select an API or may choose another option to upload individual images or live video.

Using various embodiments' sensors, video input processor 110 may be configured to parse metadata directly from the Key Link Value (KLV) stream in the video data file. In various embodiments, system 100 may extract data from a video stream external to system 100, and system 100 may include processing components that parse and extract metadata. In various embodiments, video input 102 may include data from an external hardware system, UAV input or a video processing system known in the art. In other embodiments, video input processor 110 may be configured with an API method of updating the metadata. In various embodiments data may be uploaded manually, asynchronously or synchronously from an external or operatively coupled source.

In various other embodiments, a user or programmer may define metadata options either before or during initialization using the user interface 130. Metadata may include information received from sensors or about any property related to or determined by sensors. Metadata may also include other data known in the art that is not part of the programming instructions, and that may or may not be acquired during the process of creating the video input. Metadata may include values such as, but not limited to, sensor positioning, coordinates, time and date, and other important information that may be correlated with the objects in the video input 102.

In various embodiments, correlation of metadata may provide additional information such as an object's geographic coordinates and the time and date it was seen. While the system can fully run without any sensor metadata, features requiring metadata (such as, but not limited to, geo-referencing) will be disabled.

Video input 102 may be any type of video data, data structure, signal or storage file known in the art. In various embodiments, video input 102 may be a real-time video data feed transmitted from a satellite, aircraft, UAV or other aerial vehicle. In still other embodiments, video input 102 may include signals, encrypted or partial data from which data frames can be constructed. Video input data 102 may be used to create a data file such as, but not limited to, an .mpeg, .avi, or any other proprietary or custom file received by input processor 110.

Output delivery component 140 is any display interface, file, annotated image, signal, alert system interface or data structure known in the art for receiving and communicating processed image data. Output delivery component 140 displays and/or communicates annotated video data. In various embodiments, output delivery component 140 may also display and/or communicate software objects having updated properties to represent image outliers, anomalies, tracked objects or defined targets.

Output delivery component 140 may store, communicate or display updated or processed video data that is transformed to produce a video output file, which includes information about anomalies determined to exist in video data and stored in anomaly objects 122. Anomaly objects 122 are data structures that represent one or more anomalies identified through one or more filtering and testing processes performed by computer processing components 120. Anomaly objects 122, or any alternative data structure known in the art, may include properties that reflect stored data values such as regarding the risk and location coordinates of anomalies.

A user may also define settings for system 100 including, but not limited to, settings for video input processor 110 and output delivery component 140, as well as information about the input video, cropping margins, algorithms to be run, parameters of the anomaly detection, parameters for tracking, parameters for feature extraction and feature matching, output settings for tip sheets, and output destination. In the exemplary embodiment shown, parameters not explicitly set during initialization will use a default value specified by the programming of the application FIG. 1 also illustrates memory storage component 124, which may store video input 102 and new anomaly data objects that have been created and updated by system 100. In the embodiment shown, computer processing components 120 are hardware processing components that may be stored on a single computer apparatus or on geographically-distributed computer processing components configured with circuitry and software for performing operations. Computer processing components 120 may include various filtering processors, computer vision-related processors, tracking processors and display processors.

In various alternative embodiments, a plurality of computer processing components 120 may operate in serial or parallel to create software objects that continually update anomaly object property values, which reflect the risk and location coordinates of anomaly objects for the duration of a video feed, or until all video input frames in a video have been processed. Computer processing components 120 may also operate in serial, tracking two or more simultaneous anomalies that may be interpreted as potential threats.

In various embodiments, system 100 may be operatively coupled with other threat detection and communication alert systems. Various properties within Anomaly objects 122 may be used as parameters to functions and processes. Examples of video data properties that may be tracked and updated include threshold values, and the testing and filtering of video data properties such as signal-to-noise ratio, image properties, anomaly properties, and any other information that may be used as parameters to functions and processes described herein.

Figure 2A:
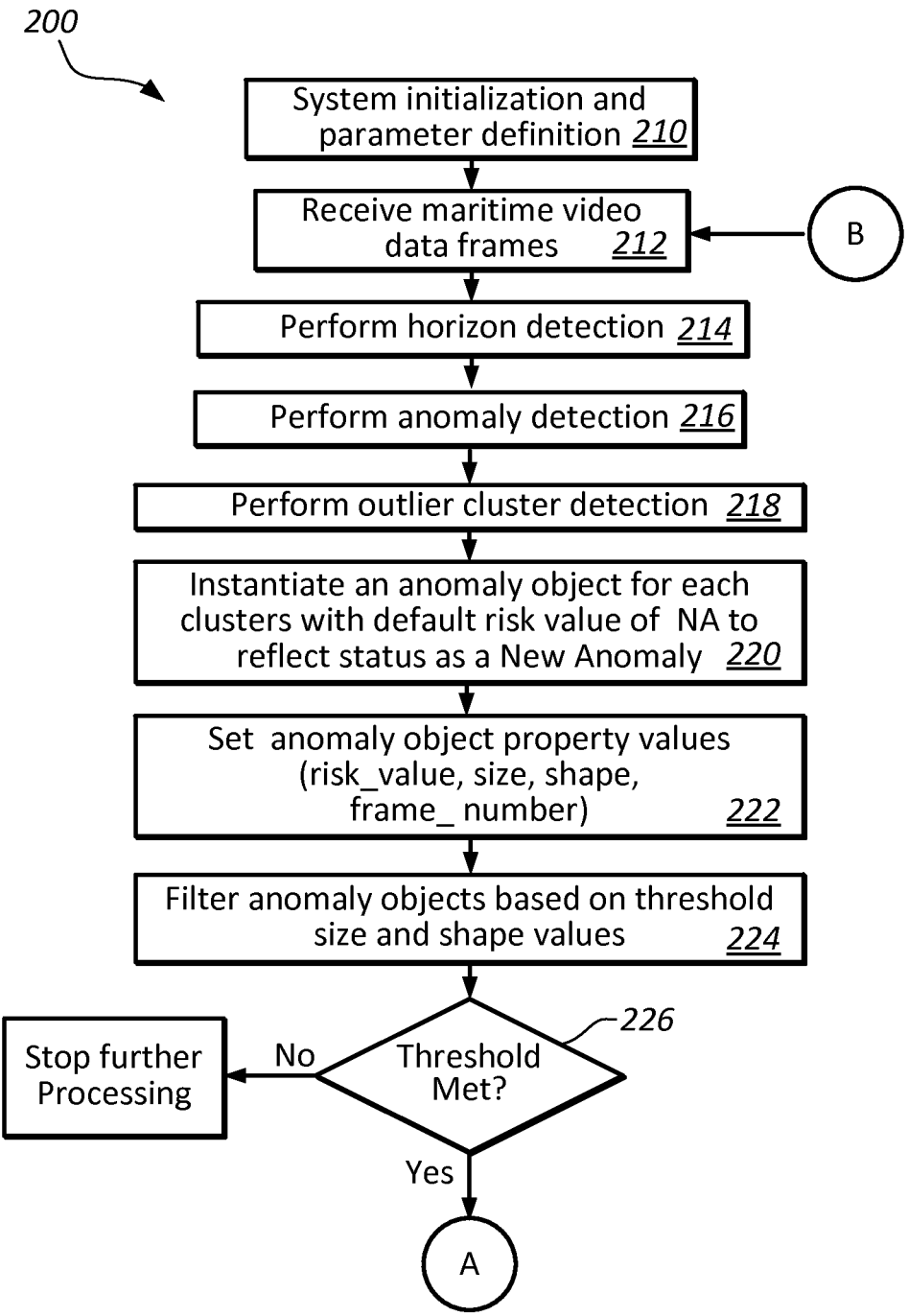
FIGS. 2A and 2B show a flowchart of an embodiment of a method for automating the detection of anomalies in maritime video data.
Figure 2B:
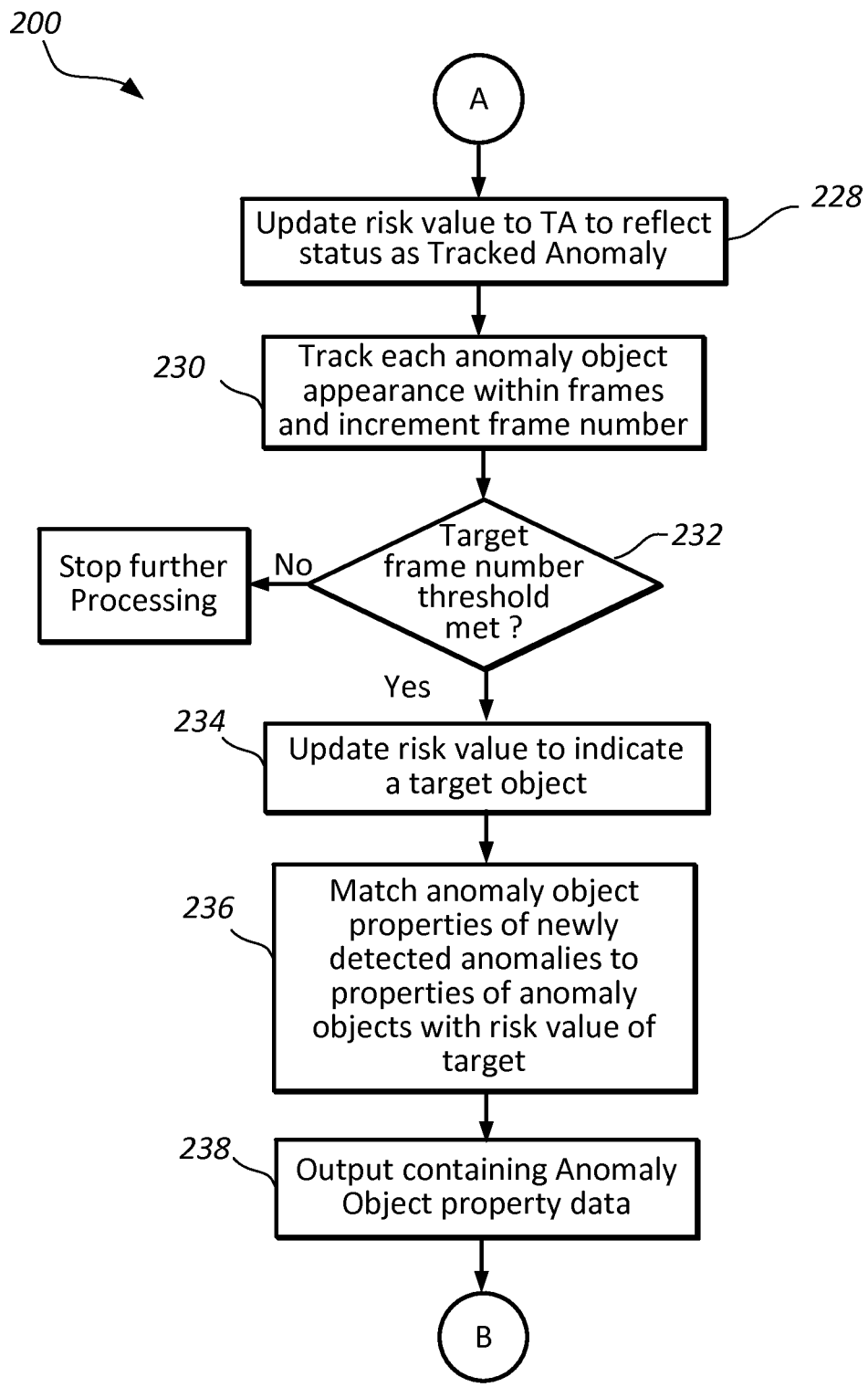

FIG. 2 illustrates a flow chart of an embodiment of a method 200 for detecting, tracking and storing data on multiple maritime domain targets. The maritime domain target tracking method is first initialized and system defined parameter values are set at step 210. The system receives video data frames in a file or by live feed at step 212. In some embodiments of method 200, horizon detection may then be performed using a horizon detection algorithm at step 214. In some embodiments, method 200 proceeds from step 212 to step 216, which involves detecting anomalous areas in the video frames.

Method 200 may then proceed to perform outlier cluster detection at step 218. At step 220, an anomaly object is instantiated for each cluster, and at step 220 the property values for the anomaly object are set to evaluate and track each cluster. At step 224, anomaly objects are then filtered and either discarded or tracked further. At step 226, a determination is made whether or not the threshold is met. If not, the method ends. If so, step 228 involves updating the risk value to Tracked Anomaly (TA) to reflect the status of the anomaly as being tracked.

Step 230 then involves tracking each anomaly object appearance within the frames and incrementing a frame number property of the anomaly object. At step 232, a determination is made as to whether or not the target frame number threshold has been met. If not, no further processing occurs until the target frame number is met. If the frame-number property reaches a threshold value, step 234 involves updating the risk value to indicate a target. In some embodiments, method 200 then proceeds to step 236, which involves matching anomaly object properties of newly detected anomalies to properties of anomaly objects with a risk value of target. Following step 236, method 200 may proceed to step 238. In some embodiments, method 200 proceeds directly from step 234 to step 238. At step 238, an annotated video output containing anomaly object property data is created.

Specifically, step 210 involves initializing the maritime domain target tracking method and defining system parameter values. In various embodiments of step 210 initialization, a user may set parameters for video input and output delivery of analyzed or annotated data. Parameters may include cropping margins, algorithms to be run, parameters of the anomaly detection, parameters for tracking, parameters for feature extraction and feature matching, output settings for tip sheets, and output destination. Parameters not explicitly set during initialization will use a default value specified by the programming of the application. In various embodiments of step 210, a user or programmer may define metadata options either before or during initialization using user interface 130. Metadata option selections may include sensor positioning data, coordinates data, time and date, and other information relevant to target tracking buy which is not used to alter the process.

Metadata may be input into the system in several ways. For example, sensors may embed the metadata directly into a Key Link Value (KLV) stream in the video file itself. If the metadata is in the standard STANAG 4859 format, system 100 may automatically start extracting and using the metadata. If the video does not contain the metadata, or if system 100 is being used with a live feed, the software API may contain a method for manually, asynchronously updating the metadata.

Step 212 involves receiving video input 102 in a series of video data frames by live feed or in the form of any file or data structure known in the art for storing video data frames. Step 214 involves performing a horizon detection function and is discussed in more detail with respect to FIG. 4.

Step 216 involves performing an anomaly detection function. The anomaly detection function is used to identify potential anomalies that require further tracking by highlighting anomalous regions of a given frame. The anomaly detection function may be comprised of the steps as shown and described in more detail with respect to FIG. 3. Briefly, one embodiment of the anomaly detection function first divides the input frame into small sub-frames. The function then calculates a signal-to-noise ratio value for each sub-frame and compares the signal-to-noise ratio value to a threshold value to calculate an anomaly status value. An anomaly status value is then assigned and each sub-frame data record reflects a value of either anomalous or non-anomalous.

In some embodiments, an anomaly filter is used to highlight anomalous regions of a given frame. First, the anomaly filter divides the image into small sub-images, then performs a 2-D Fast Fourier Transform, and then performs a statistical comparison of the Fourier coefficients. Sub-images who have Fourier coefficient vectors that are outliers are considered to be anomalous regions. An anomaly detection filter is most suitably used when objects are to be found in a scenario with a constant background, such as the ocean.

Step 218 outlier cluster detection to determine if at least one cluster comprised of at least two adjacent anomalous sub-frames exists. If a cluster exists, the cluster is associated with a data structure for tracking further information about the cluster, including but not limited to, instantiating a new data structure.

Step 220 involves instantiating an anomaly object. In this step information about each cluster's size, shape, and position is recorded by updating data properties of the anomaly object. In the exemplary method shown, the anomaly object is assigned a risk value of NA to indicate, at various stages of processing, a New Anomaly has been identified that has not been tracked for the number of frames in which it appears. Each new anomaly represents a point of interest in the frame.

In the exemplary embodiment shown, risk value of an anomaly object may be set at one of three defined values: New Anomaly, Tracked Anomaly, and Target. For each input frame, the system creates a set of anomaly objects for which the initial risk value is set at a default value of NA. The system then matches each anomaly object to a current anomaly object with a risk value of Target or TA. If the properties of the anomaly object do not correspond to those of a current anomaly object with a risk value of Target or TA, the system changes the risk value from NA into TA.

Step 222 involves setting various property values within the anomaly object. These property values reflect the size, shape, and movement patterns of an anomaly. The risk value of the anomaly object is set at a value of NA to indicate that it has simply been identified as a New Anomaly. The anomaly object also includes at least one location-coordinate property value, which may be updated periodically or continuously to track the geographic location of actual anomaly objects depicted as a cluster associated with the anomaly object. The anomaly object may include additional properties to update information as to the maritime object that produced the anomaly object (e.g., a ship).

Step 224 involves filtering anomaly objects to exclude them from further processing based on size and shape properties. This step eliminates false positives and alerts inherent in human review and processing of video data frames. In this step, various thresholds for filtering criteria values relating to the shape and size of a cluster are used to filter out anomaly objects for which no further processing will be performed based on the system presumption that their size and shape does not indicate them statistically likely to be threats. The threshold for filtering criteria for excluding objects from further processing may be either user defined or a predetermined system parameter.

At step 226, a determination is made as to whether a filtering criteria threshold for further processing has been met. If the anomaly object does not meet the threshold, no further processing occurs and the object is discarded. Anomaly objects that meet the filtering criteria for further processing will be processed further and the method proceeds to step 228. Step 228 involves updating risk and location-coordinate property values. In this step, clusters associated with an anomaly object update the risk and location-coordinate property values of each anomaly object.

In step 230, the number of frames in which an anomaly object appears is tracked. At step 232, a determination is made as to whether a target frame number threshold has been met. If not, processing is stopped. If so, namely that the cluster (as represented by the properties of the anomaly object) appears in the same spot in more than one consecutive frame, the risk value of the associated anomaly object is updated to Target at step 234. The system begins to record all information about the anomaly object with a risk value of Target in each frame data log. If desired, the user is alerted to the presence of an anomaly object with a risk value of Target.

When anomaly object risk value is updated to Target, the updated value may invoke one or more functions for annotation, cropping, tracking or alert functions. In one exemplary embodiment, the updating of the risk value to Target may invoke a function to send an alert in additional tracking software of systems external to the method described herein initialized. In other embodiments, the updating of the risk value may invoke functions that process data frames, save image features, analyze image features or perform data, metadata and feature extraction functions. Still other embodiments, based on updated risk values, may invoke functions to assign an identification number to the anomaly object and record how long the Target-value anomaly object has been consistently within the video frame, and if a known Target-value anomaly object is absent for any number of frames.

Functions may also be invoked when other properties within the anomaly object, such as geographic coordinates, are updated. In various embodiments, geographic coordinates may be utilized as filtering data. In various embodiments, anomaly object may be filtered by Kalman Filters to reduce noise.

In some embodiments, method 200 proceeds to step 236, which involves matching anomaly objects for a new anomaly to the properties of an identified Target. Properties may include size, shape, color and position. Properties of anomaly object having a risk value of Target can be matched to anomaly objects having a risk value of NA using their extracted features and image recognition. Various image recognition and feature detection algorithms known in the art can match the same object in two images with great speed and accuracy, regardless of scale and rotation. One example of such an algorithm is the Speeded Up Robust Algorithm (SURF) algorithm of Herbert Bay et al.

Image chip properties of an anomaly object having a risk value of Target can be matched to an anomaly object having a value of NA. In the new video frame and within a certain confidence, the anomaly object having a value of NA is considered to be that anomaly object having a risk value of Target. The information for the anomaly object having a risk value of Target is updated to reflect the match and the anomaly object having a value of NA is discarded. The image chip for the anomaly object having a risk value of Target is updated occasionally to improve the image recognition since the anomaly object having a risk value of Target will often quickly change in appearance due to factors such as lighting, scaling, positioning, and environmental changes during the course of the video.

In the exemplary embodiment shown, anomaly object having the risk value of Target are not discarded after not being seen for a single frame. If they are absent from the video frame for set amount of time, they are considered a lost target and are no longer actively searched for using position, shape, size, matching or image recognition. However, if the risk value of an anomaly object having the risk value of TA is being changed to Target, all previous anomaly object with lost target risk values are queried to determine if the anomaly object in question is in fact one of the previous anomaly object coming back into the frame. If so, the anomaly object is once again considered a Target and its risk value is updated appropriately.

In some embodiments, method 200 proceeds directly from step 234 to step 238, which involves creating an output delivery component reflecting the analysis of video input. This output delivery component may include information about all anomaly objects and the risk values and other properties associated with the anomaly objects. In various embodiments, the output delivery component may be an output delivery media or display known in the art, including but not limited to an annotated video, a Hypertext Markup Language (HTML) tip sheet, a Keyhole Markup Language (KML) tip sheet or an Extensible Markup Language (XML) dataset.

In various embodiments, the output delivery component may be annotated video, a copy of the original video with annotations. Specifically displayed annotations may be custom-set by the user. Possible annotations include, but are not limited to the following: highlighting detected targets, highlighting all detected statistical anomalies, displaying a target's ID number, displaying the targets estimated latitude and longitude, and displaying video/sensor metadata.

In one exemplary embodiment, the output delivery component may be an HTML tip sheet document summarizing the video metadata, details of the detection performed by the method, and a summary of each anomaly object detected in the video input. Details of the detection disclosed in the output delivery component can include, but are not limited to, detector settings, time performed, the length of video input, and how long the detection process took. The summary is in the form of a table and includes at a minimum for each anomaly object the anomaly object identification number, an image chip of the anomaly object, how long the anomaly object was present in the video input, the time in the video input that the anomaly object was first seen, the time the anomaly object was last seen, and the anomaly object's geographic coordinates.

In one exemplary embodiment, the KML tip sheet may be utilized as the output delivery component. KML plots the results of the detection on Google Earth's virtual globe. For each anomaly object, the complete track is plotted onto the globe and the anomaly object's starting and end position are annotated. If the user selects an anomaly object, the system presents additional information similar to the information provided in the HTML tip sheet. In addition to the tracks produced by the anomaly object, the system also includes a track of the sensor. Information about the video input and the details of the detection process are all made available through the KML tip sheet.

In still other exemplary embodiments of the output delivery component, the system may create an XML dataset from data collected. This format allows easy ingestion into a database or another system. In various embodiments, the system may save, export or display the output delivery component. In some embodiments, the system may communicate the output delivery component to an external entity via a communications component. After step 238, system 100 may proceed back to step 212 to begin analysis of a new input video frame. After this step, steps 214 through 238 are repeated iteratively until all frames of the video file, individual images or live video, are analyzed.

Figure 3:
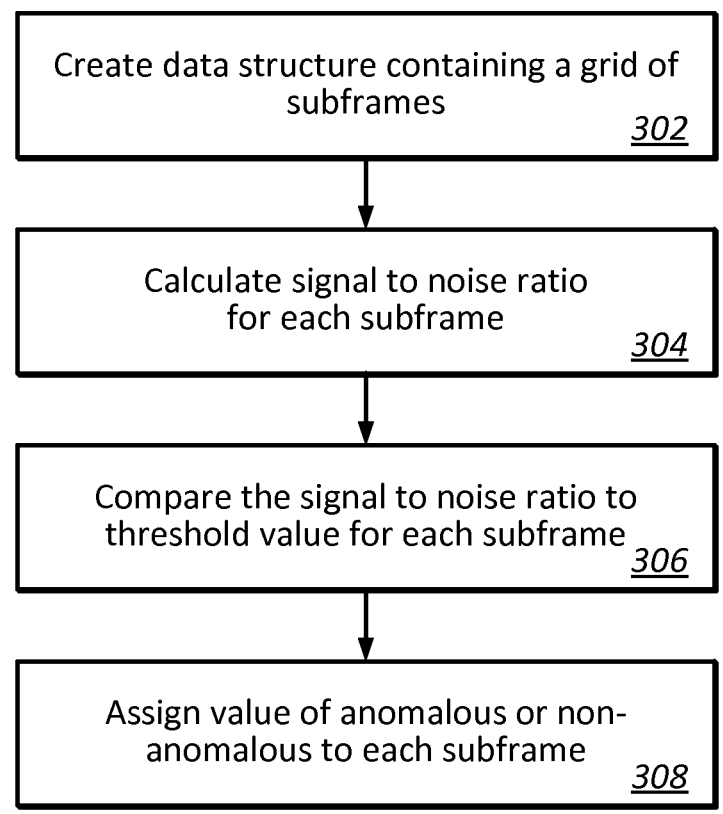
FIG. 3 shows a flowchart of an embodiment of a method for detecting anomalous portions of video frames.

FIG. 3 shows an embodiment of an anomaly detection algorithm 300 which specifically detects anomalous portions of video data frames. The function is invoked when a new video data frame is received, such as in step 212 of method 200. Anomaly detection algorithm 300 is iteratively run for each video data frame.

In step 302, a data structure is created for the data frame, which divides the data frame into small sub-frames using a grid. In step 304, a signal-to-noise ratio is calculated, and a signal-to-noise ratio value is generated for each sub-frame. In step 306, an anomaly status value is calculated from the signal-to-noise ratio value. In step 308, the anomaly status value is compared to a threshold value in the system or an algorithm is performed to determine a threshold value. An anomaly status value is then assigned a value of either anomalous or non-anomalous.

Figure 4:
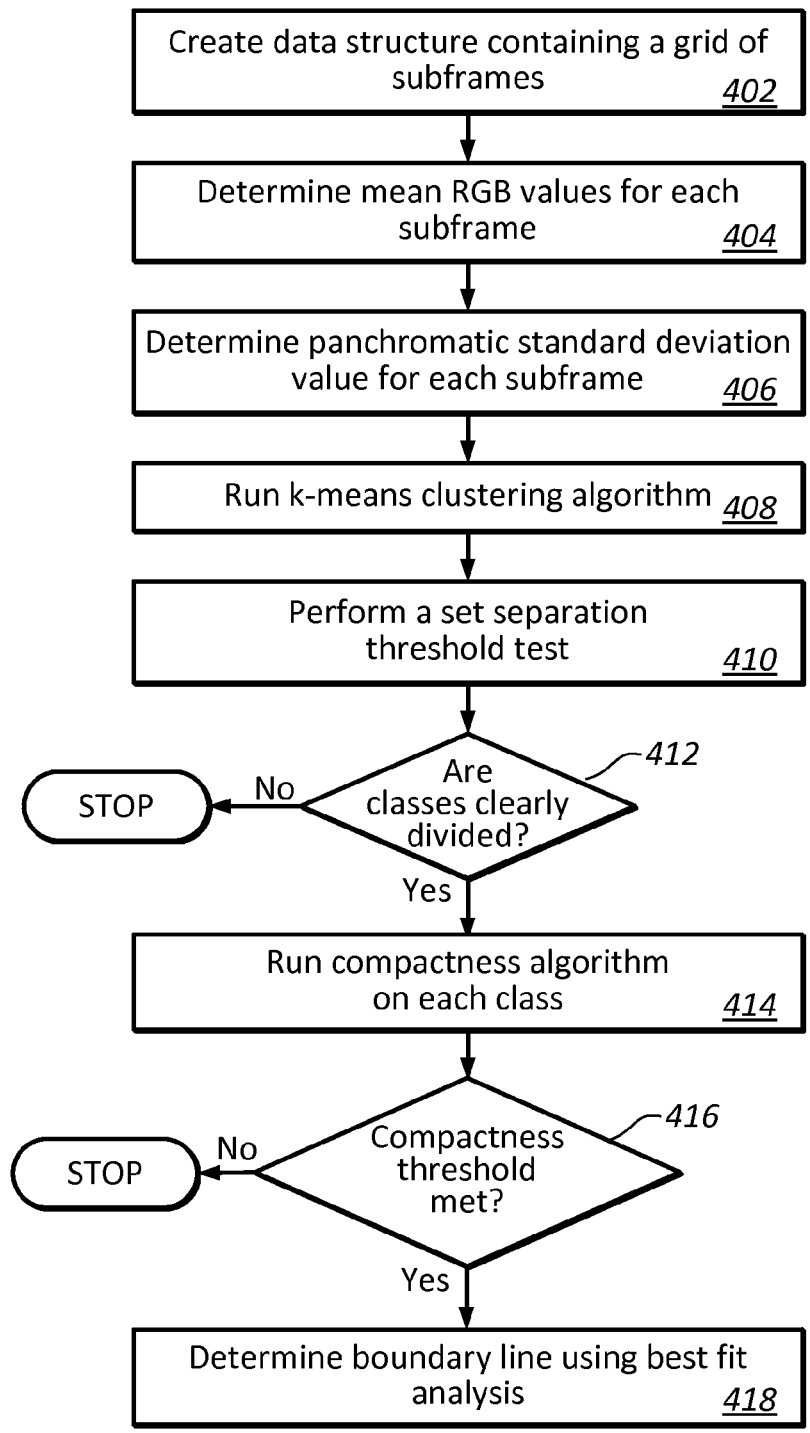
FIG. 4 shows a flowchart of an embodiment of a method for horizon detection.

FIG. 4 shows an embodiment of the step that performs a horizon detection method 400 on the input frame, namely step 214 shown in FIG. 2. Horizon detection is the problem of distinguishing sky and water in video images so that superfluous data can be discarded. The separation between the sky and water can be detected and the sky can be masked out. The benefits of using horizon detection include 1) no false detections will be made in the sky region; and 2) the anomaly detection will produce better results without the clutter and distinct features of the sky. The user can specify for horizon detection to be run for every frame, never, or only when the sensor metadata indicates a horizon may be in the image.

After the video frame is received, such as in step 212 of method 200, step 402 involves creating a data structure that contains a grid which splits the frame into smaller sub-images. Step 404 involves determining the mean red, green, and blue value for each sub-image. Sub-images are assigned to one of two classes based on color (blue, green, red) values. Step 406 involves determining the sub-image's panchromatic standard deviation value. Step 408 involves running a generic K-means clustering algorithm on the full image.

Step 410 involves performing a set separation test and continuing based on a threshold. In the exemplary embodiment shown, a Davies-Bouldin index is used to determine the quality of the separation of the two classes. At step 412, a determination is performed to decide if the classes are clearly divided into the top and bottom portions of the image. If this is true, two classes are created to represent the image from top and bottom to separate outliers. If the classes are not clearly divided, the process stops.

At step 414, a generic compactness algorithm is run on each of the class clusters. Step 416 involves a determination as to whether a compactness threshold has been met. If not, the process stops. If the shape of each class cluster meets a compactness threshold, then the image is assumed to be a horizon image where the top-class cluster is the sky and the bottom-class cluster is water.

Method 400 then proceeds to step 418, where a best-fit line is calculated. This portion of the algorithm uses points across the boundary of the two class clusters to calculate a best-fit line. This line can now be used to annotate the video output or mask the sky from the ground during the target detection. This method improves detection in two ways: 1) no false detections will be made in the sky region and 2) the anomaly detection will produce better results without the clutter and distinct features of the sky.

It will be understood that many additional changes in the details, materials, steps and arrangement of parts, which have been herein described and illustrated to explain the nature of the invention, may be made by those skilled in the art within the principal and scope of the embodiments of the invention as expressed in the appended claims.

We claim:

1. A method comprising the steps of:
receiving at least one video input containing a plurality of video frames;
performing an anomaly detection function comprising the steps of designating a plurality of sub-frames within each of the plurality of video frames wherein each of the plurality of sub-frames has a quasi-unique grid location within the plurality of video frames, calculating a signal-to-noise ratio value for each of the plurality of sub-frames, and comparing the signal-to-noise ratio value for each of the plurality of sub-frames to a signal-to-noise threshold value to identify anomalous sub-frames and non-anomalous sub-frames;
performing a cluster detection algorithm to identify at least one cluster wherein the at least one cluster is comprised of at least two of the anomalous sub-frames, wherein the anomalous sub-frames are adjacent;
instantiating an anomaly object, wherein the anomaly object is a data structure which includes at least one property corresponding to at least one cluster property;
performing at least one filtering algorithm to compare at least one property of the anomaly object to at least one threshold value and discarding an anomaly object if the filtering algorithm indicates a risk of false detection;
updating a risk value property of each the anomaly object that is not discarded to indicate that the anomaly object is a tracked anomaly object;
incrementing the number of frames property each time the tracked anomaly object appears in at least one video frame;
updating the risk value property of the tracked anomaly object to indicate that the tracked anomaly object is a target object when the number of frames property exceeds a consecutive frames threshold value;
updating at least one location coordinate property value for the target object; and
updating properties of the at least one video input to create an annotated video output.

2. The method of claim 1, further including the step of running a horizon detection algorithm on a video frame when data depicting a horizon is present in at least one of the plurality of video frames.

3. The method of claim 2, wherein the horizon detection algorithm comprises steps of:
designating the plurality of sub-frames within each of the plurality of video frames wherein each of the sub-frames have the quasi-unique grid location;
using a K-means function to classify the sub-frames as sky-class data or water-class data; and
discarding sub-frames designated as sky-class data.

4. The method of claim 3 further comprising the step of setting a set separation threshold.

5. The method of claim 2 further comprising the step of setting parameters for determining the time intervals for running the horizon detection algorithm.

6. The method of claim 1, wherein the step of performing at least one filtering algorithm includes comparing a size property value of an anomaly object and a shape property value of an anomaly object to the threshold value to determine if the anomaly object is discarded.

7. The method of claim 1 wherein the step of updating a risk value property of each anomaly object that is not discarded includes updating risk and location-coordinate property values.

8. The method of claim 1 wherein the annotated video output reflects updated properties of the at least one tracked anomaly object.

9. The method of claim 1 wherein the annotated video output reflects updated properties of the at least one target object.

10. The method of claim 1 further comprising the step of, prior to receiving at least one video input, setting system defined parameter values.

11. The method of claim 10, wherein system defined parameter values are selected from a group consisting of video data input type, cropping margin parameters, algorithms selected to run, algorithm parameters, anomaly detection threshold parameters, feature extraction parameters, feature matching parameters, output settings, and output destination parameters.

12. The method of claim 1 further comprising the step of, prior to receiving at least one video input, providing at least one user-defined meta-data parameter.

13. The method of claim 12, wherein the step of providing at least one user-defined meta-data parameter includes the step of extracting metadata.

14. The method of claim 1, further including the step of identifying geographical coordinates of a cluster associated with an anomaly object having a risk property value of a target object.

15. The method of claim 14, wherein the geographical coordinates are estimated.

16. The method of claim 1, further including the step of concurrently updating properties of more than one anomaly object values.

17. A non-transitory computer-readable storage medium having a method stored thereon, the method represented by computer-readable programming code, the method comprising the steps of:
receiving at least one video input containing a plurality of video frames;
performing an anomaly detection function comprising the steps of designating a plurality of sub-frames within each of the plurality of video frames wherein each of the plurality of sub-frames has a quasi-unique grid location within the plurality of video frames, calculating a signal-to-noise ratio value for each of the plurality of sub-frames, and comparing the signal-to-noise ratio value for each of the plurality of sub-frames to a signal-to-noise threshold value to identify anomalous sub-frames and non-anomalous sub-frames;
performing a cluster detection algorithm to identify at least one cluster wherein the at least one cluster is comprised of at least two of the anomalous sub-frames, wherein the anomalous sub-frames are adjacent;
instantiating an anomaly object, wherein the anomaly object is a data structure which includes at least one property corresponding to at least one cluster property;
performing at least one filtering algorithm to compare at least one property of the anomaly object to at least one threshold value and discarding an anomaly object if the filtering algorithm indicates a risk of false detection;
updating a risk value property of each the anomaly object that is not discarded to indicate that the anomaly object is a tracked anomaly object;
incrementing the number of frames property each time the tracked anomaly object appears in at least one video frame;
updating the risk value property of the tracked anomaly object to indicate that the tracked anomaly object is a target object when the number of frames property exceeds a consecutive frames threshold value;
updating at least one location coordinate property value for the target object; and
updating properties of the at least one video input to create an annotated video output.

18. A system comprising:
a video input processor configured to receive at least one video input comprised of a plurality of video data frames;
a video output delivery component for delivering annotated video output;
a computer processing component, the computer processing component operatively coupled to a user input and an output display; and
a storage device operatively connected to the computer processing component, the storage device having program instructions stored therein, the program instructions executable by the computer processing component to perform a method comprising the steps of:
receiving at least one video input containing a plurality of video frames;
performing an anomaly detection function comprising the steps of designating a plurality of sub-frames within each of the plurality of video frames wherein each of the plurality of sub-frames has a quasi-unique grid location within the plurality of video frames, calculating a signal-to-noise ratio value for each of the plurality of sub-frames, and comparing the signal-to-noise ratio value for each of the plurality of sub-frames to a signal-to-noise threshold value to identify anomalous sub-frames and non-anomalous sub-frames;
performing a cluster detection algorithm to identify at least one cluster wherein the at least one cluster is comprised of at least two of the anomalous sub-frames, wherein the anomalous sub-frames are adjacent;
instantiating an anomaly object, wherein the anomaly object is a data structure which includes at least one property corresponding to at least one cluster property;
performing at least one filtering algorithm to compare at least one property of the anomaly object to at least one threshold value and discarding an anomaly object if the filtering algorithm indicates a risk of false detection;
updating a risk value property of each the anomaly object that is not discarded to indicate that the anomaly object is a tracked anomaly object;
incrementing the number of frames property each time the tracked anomaly object appears in at least one video frame;
updating the risk value property of the tracked anomaly object to indicate that the tracked anomaly object is a target object when the number of frames property exceeds a consecutive frames threshold value;
updating at least one location coordinate property value for the target object; and
updating properties of the at least one video input to create an annotated video output.

19. The system of claim 18, wherein the storage device further has program instructions stored therein to enable the method to further perform the step of running a horizon detection algorithm on a video frame when data depicting a horizon is present in at least one of the plurality of video frames.

20. The system of claim 19, wherein the horizon detection algorithm comprises the steps of:
designating the plurality of sub-frames within each of the plurality of video frames wherein each of the sub-frames have the quasi-unique grid location;
using a K-means function to classify the sub-frames as sky-class data or water-class data; and
discarding sub-frames designated as sky-class data.

* * * * *